US011603800B2

(12) United States Patent
Lacko et al.

(10) Patent No.: US 11,603,800 B2
(45) Date of Patent: Mar. 14, 2023

(54) FIREWALL ASSEMBLIES FOR HYBRID ELECTRIC AIRCRAFT POWERPLANTS

(71) Applicant: Rohr, Inc., Chula Vista, CA (US)

(72) Inventors: Anthony Lacko, San Diego, CA (US); Frank Becker, Saint Lambert (CA); Antonio Pizzi, Verdun (CA)

(73) Assignee: Rohr, Inc., Chula Vista, CA (US)

( * ) Notice: Subject to any disclaimer, the term of this patent is extended or adjusted under 35 U.S.C. 154(b) by 280 days.

(21) Appl. No.: 17/110,180

(22) Filed: Dec. 2, 2020

(65) Prior Publication Data

US 2021/0163142 A1 Jun. 3, 2021

Related U.S. Application Data

(60) Provisional application No. 62/943,027, filed on Dec. 3, 2019.

(51) Int. Cl.
| | |
|---|---|
| *F02C 7/25* | (2006.01) |
| *A62C 2/06* | (2006.01) |
| *A62C 3/08* | (2006.01) |
| *B64D 27/02* | (2006.01) |
| *B64D 27/24* | (2006.01) |
| *B64D 29/00* | (2006.01) |
| *F02B 77/11* | (2006.01) |
| *H02K 5/04* | (2006.01) |

(52) U.S. Cl.
CPC ............. *F02C 7/25* (2013.01); *A62C 2/06* (2013.01); *A62C 3/08* (2013.01); *B64D 27/02* (2013.01); *B64D 27/24* (2013.01); *B64D 29/00* (2013.01); *F02B 77/11* (2013.01); *H02K 5/04* (2013.01); *B64D 2027/026* (2013.01); *F05D 2260/231* (2013.01)

(58) Field of Classification Search
CPC .. B64D 27/02; A62C 2/06; A62C 3/08; F02C 7/25
See application file for complete search history.

(56) References Cited

U.S. PATENT DOCUMENTS

| | | | |
|---|---|---|---|
| 4,177,693 A | * | 12/1979 | Ivanko .................... B64C 27/12 74/606 R |
| 5,115,996 A | | 5/1992 | Moller |

(Continued)

FOREIGN PATENT DOCUMENTS

| | | | | |
|---|---|---|---|---|
| CN | 107532506 B | * | 12/2020 | ............ B64D 27/02 |
| CN | 113264194 A | * | 8/2021 | ............ B64D 27/20 |
| EP | 3056423 A1 | | 8/2016 | |

OTHER PUBLICATIONS

Extended European search report issued in corresponding EP application No. 20211526.7, dated Apr. 14, 2021.

*Primary Examiner* — Michael H Wang
(74) *Attorney, Agent, or Firm* — Locke Lord LLP; Daniel J. Fiorello

(57) ABSTRACT

A hybrid electric powerplant can include an electric motor configured to convert electrical energy into kinetic energy to turn a propulsor, and a heat engine configured to convert a fuel into kinetic energy to turn the propulsor. The powerplant can include a firewall disposed around at least one of the electric motor or the heat engine to create an electric motor fire zone and a heat engine fire zone separate from the electric motor fire zone such that the electric motor is protected against a heat engine fire, and vice versa.

21 Claims, 2 Drawing Sheets

(56) References Cited

U.S. PATENT DOCUMENTS

| | | |
|---|---|---|
| 10,427,775 B2 | 10/2019 | Mores et al. |
| 10,633,104 B2 * | 4/2020 | Miller .................... B64D 27/24 |
| 2016/0236767 A1 * | 8/2016 | Mores ...................... B64C 1/40 |
| 2017/0275009 A1 | 9/2017 | Huang |
| 2018/0111469 A1 * | 4/2018 | Laimboeck .............. B60K 6/40 |
| 2020/0115045 A1 * | 4/2020 | Mermoz ................ B64C 39/08 |

* cited by examiner

FIREWALL ASSEMBLIES FOR HYBRID ELECTRIC AIRCRAFT POWERPLANTS

CROSS-REFERENCE TO RELATED APPLICATIONS

This application claims priority to and the benefit of U.S. Provisional Application No. 62/943,027, filed Dec. 3, 2019, the entire contents of which are herein incorporated by reference in their entirety.

FIELD

This disclosure relates to hybrid electric powerplants.

BACKGROUND

A nacelle usually forms a firewall between an engine and the wing, engine mount pylon, or other aircraft structure not considered a fire zone. However, in a hybrid electric powerplant, traditional assemblies may not be acceptable for power lane redundancy and independence.

Such conventional methods and systems have generally been considered satisfactory for their intended purpose. However, there is still a need in the art for firewall assemblies for hybrid electric aircraft powerplants. The present disclosure provides a solution for this need.

SUMMARY

A hybrid electric powerplant can include an electric motor configured to convert electrical energy into kinetic energy to turn a propulsor, and a heat engine configured to convert a fuel into kinetic energy to turn the propulsor. The powerplant can include a firewall disposed around at least one of the electric motor or the heat engine to create an electric motor fire zone and a heat engine fire zone separate from the electric motor fire zone such that the electric motor is protected against a heat engine fire, and vice versa.

The powerplant can further comprise a nacelle. The electric motor, the heat engine, and the firewall can be disposed within the nacelle. In certain embodiments, the nacelle can form at least a portion of the firewall.

The firewall may be only an electric motor firewall that is disposed around the electric motor. In such cases, there may be no separate heat engine firewall surrounding the heat engine. All electric motor components within the nacelle can be contained within the firewall.

Certain embodiments can include a fire extinguisher system comprising at least one fire extinguishing medium source and at least a first outlet and a second outlet. The first outlet can be configured to provide extinguishing medium to the electric motor fire zone. The second outlet can be configured to provide extinguishing medium to the heat engine fire zone.

The electric motor fire zone can be fluidly sealed from the heat motor fire zone such that extinguishing medium can be used in either fire zone independent of the other. The firewall can include a metallic and/or composite baffle that surrounds the electric motor to form the electric motor fire zone. The baffle can be configured to be bolted to a nacelle.

Certain embodiments can include a ventilation pathway for each fire zone for providing outside air to each fire zone. The ventilation pathway can include a dedicated nacelle scoop in fluid communication with each fire zone, for example.

In accordance with at least one aspect of this disclosure, an aircraft can include at least one hybrid electric aircraft powerplant as disclosed herein, e.g., as described above. Any suitable type of aircraft and/or any other suitable aircraft components are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
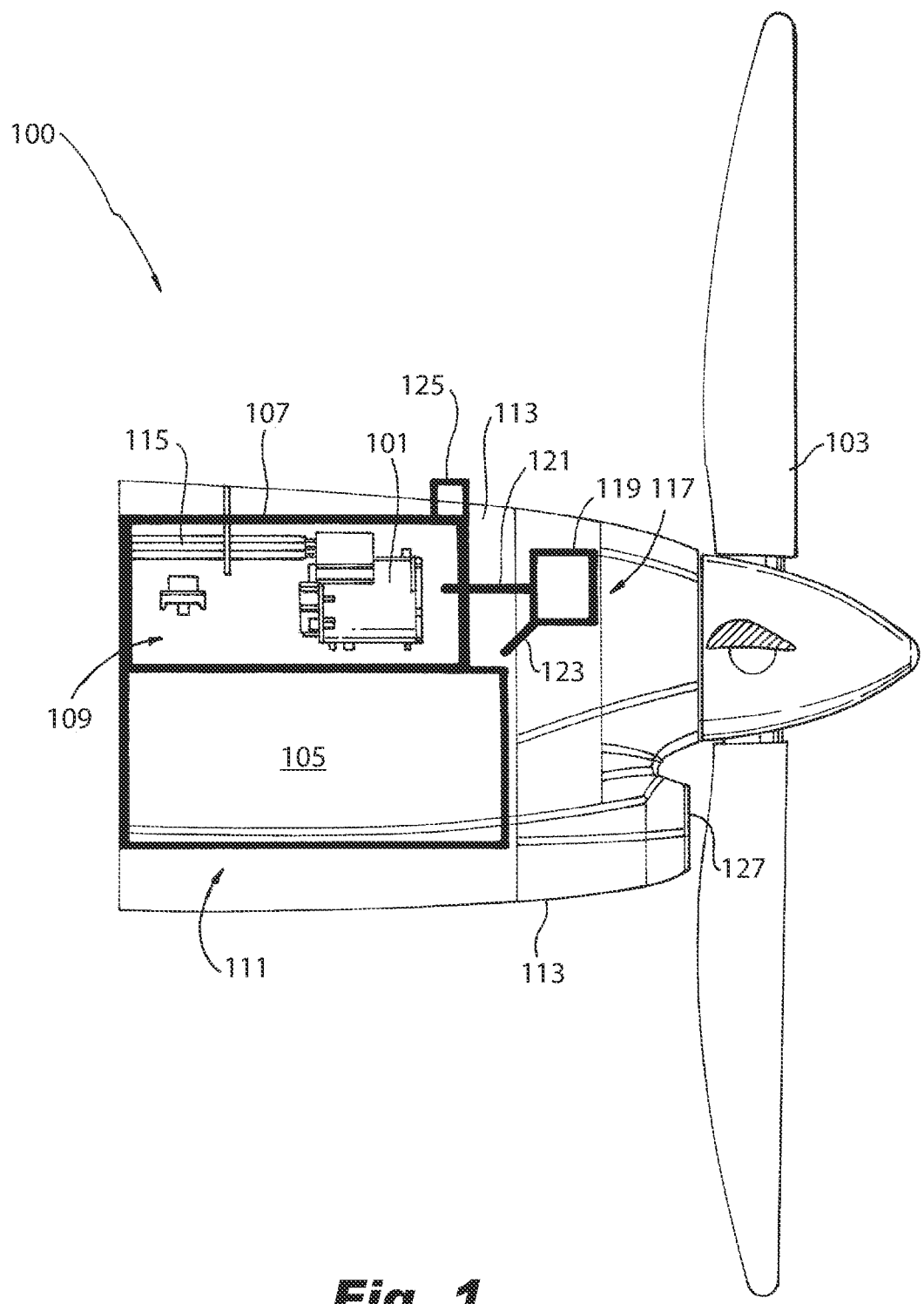
FIG. 1 is a cross-sectional view of an embodiment of a powerplant in accordance with this disclosure.

Reference will now be made to the drawings wherein like reference numerals identify similar structural features or aspects of the subject disclosure. For purposes of explanation and illustration, and not limitation, an illustrative view of an embodiment of a powerplant in accordance with the disclosure is shown in FIG. 1 and is designated generally by reference character 100. Other embodiments and/or aspects of this disclosure are shown in FIG. 2.

Figure 2:
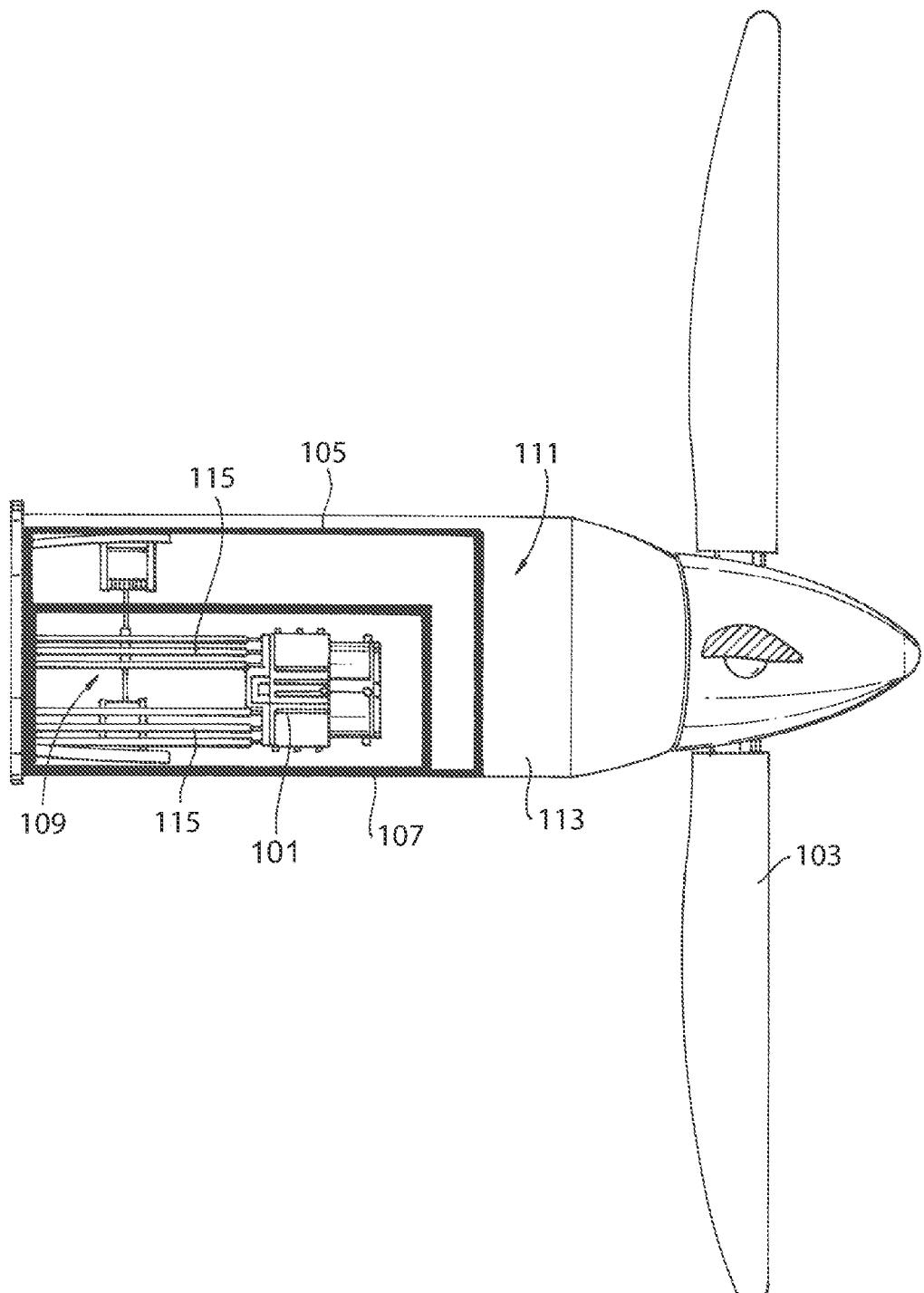
FIG. 2 is a plan view of the embodiment of FIG. 1.

Referring to FIGS. 1 and 2, a hybrid electric powerplant 100 can include an electric motor 101 configured to convert electrical energy into kinetic energy to turn a propulsor 103 (e.g., a propeller as shown). The powerplant 100 can include a heat engine 105 configured to convert a fuel into kinetic energy to turn the propulsor 103. The powerplant 100 can include a firewall 107 disposed around at least one of the electric motor 101 or the heat engine 105 to create an electric motor fire zone 109 and a heat engine fire zone 111 separate from the electric motor fire zone 109 such that the electric motor 101 is protected against a heat engine fire, and vice versa. The powerplant 100 can further comprise a nacelle 113. It is noted that FIGS. 1 and 2 are not exhaustive of the possible embodiments and one having ordinary skill in the art would appreciate, in view of this disclosure, that the engine fire zone 111 can be coextensive in size with the area designated as heat engine 105, for example (e.g., such that the heat engine 105 has its own separate firewall within the nacelle 113). Any other suitable demarcation of fire zones 109, 111 is contemplated herein.

The electric motor 101, the heat engine 105, and the firewall 107 can be disposed within the nacelle 113. In certain embodiments, the nacelle 113 can form at least a portion of the firewall 107 (e.g., such that at least a portion of the firewall 107 is integral with the nacelle 113). For example, a wall of the firewall 107 can be defined by an inside wall of the nacelle 113.

The firewall 107 may be only an electric motor firewall 107, e.g., as shown, that is disposed around the electric motor 101. In such cases, e.g., as shown, there may be no separate heat engine firewall surrounding the heat engine 105. In certain embodiments, all electric motor components (e.g., power cables 115 and/or any other suitable electric motor system components) within the nacelle 113 can be contained within the firewall 107, e.g., as shown, or otherwise be fireproofed. Any other suitable arrangement is contemplated herein.

Certain embodiments can include a fire extinguisher system 117, e.g., as shown in FIG. 1. The extinguisher system 117 can include at least one fire extinguishing medium source 119 and at least a first outlet 121 and a second outlet 123. The first outlet 121 can be configured to provide extinguishing medium (e.g., extinguishing fluid and/or any other suitable extinguishing material/means) to the electric motor fire zone 109. The second outlet 123 can be configured to provide extinguishing medium to the heat engine fire zone 111. In certain embodiments, the at least one fire extinguishing medium source 119 can include a single fluid source connected to both outlets 121, 123. As appreciated by those having ordinary skill in the art, the location of outlet 123 as depicted is an example embodiment and it is contemplate that the outlet 123 can be directed into any location that is designated as engine fire zone 111.

The electric motor fire zone 109 can be fluidly sealed from the heat motor fire zone 105 such that extinguishing medium can be used in either fire zone 109, 111 independent of the other. The firewall 107 can include a metallic and/or composite baffle that surrounds the electric motor 101 or the heat engine 105 to form the electric motor fire zone 109 or the heat engine fire zone 111, for example. The baffle can be configured to be bolted to a nacelle 113, for example.

Certain embodiments can include a ventilation pathway for each fire zone 109, 111 for providing outside air to each fire zone 109, 111 (e.g., such that the firewall 107 includes at least one fluid inlet and outlet, e.g., one or more holes in the baffle). For example, the ventilation pathway can include a dedicated nacelle scoop 125, 127 in fluid communication with each fire zone 109, 111, for example. Any other suitable arrangement is contemplated herein (e.g., one scoop split between both fire zones 109, 111.

In certain embodiments (e.g., in turboprop embodiments), a lower extremity of the heat engine fire zone 111 can be defined by a fire floor within the nacelle 113. The fire floor can be on a transverse, mostly horizontal plane (although it may be canted in certain embodiments) and located above the nacelle scoop 127 (e.g., engine inlet air scoop) but below the heat engine 105. Any other suitable arrangement for a fire floor or any other barrier defining a fire zone 111 is contemplated herein.

In accordance with at least one aspect of this disclosure, an aircraft can include at least one hybrid electric aircraft powerplant 100 as disclosed herein, e.g., as described above. Any suitable type of aircraft and/or any other suitable aircraft components are contemplated herein.

Embodiments of a hybrid electric powerplant include two independent power lanes (one fuel and one electric), e.g., connected with a series of gearboxes. Each power lane is capable of producing some percentage of total thrust, for example. During an engine failure (e.g., such as a fire) in one power lane, it is likely that the other remaining power lane is still capable of producing thrust (possible reduced total thrust for the powerplant).

Embodiments integrate a nacelle firewall 107 in such a way that fully segregates the two power lanes in addition to separating the engine compartment from the wing. This creates two independent engine compartments as far as a fire/failure is concerned. Embodiments can be applied to a turbomachine type heat engine hybrid powerplant (e.g., a turboprop hybrid), or any other suitable type of heat engine hybrid powerplant (e.g., turbofan hybrid).

In the event of an engine failure, the typical procedure results in an engine being shut down and the pilot landing as soon as possible with less than all engines. This process is safer if the pilot only had to shut down, e.g., a "half" of a powerplant (e.g., since the other power lane can still operate in a fire failure of a first power lane). Embodiments can increase the range of the aircraft in a failure mode, possibly increasing the chances of finding a safe place to land.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric powerplant, comprising:
   an electric motor configured to convert electrical energy into kinetic energy to turn a propulsor;
   a heat engine configured to convert a fuel into kinetic energy to turn the propulsor; and
   a firewall disposed around at least one of the electric motor or the heat engine to create an electric motor fire zone and a heat engine fire zone separate from the electric motor fire zone such that the electric motor is protected against a heat engine fire, and vice versa.

2. The powerplant of claim 1, wherein the powerplant further includes a nacelle.

3. The powerplant of claim 2, wherein the nacelle forms at least a portion of the firewall.

4. The powerplant of claim 2, wherein the electric motor, the heat engine, and the firewall are disposed within the nacelle.

5. The powerplant of claim 1, wherein the firewall is only an electric motor firewall that is around the electric motor, wherein there is no separate heat engine firewall surrounding the heat engine.

6. The powerplant of claim 5, wherein all electric motor components within a nacelle are contained within the firewall.

7. The powerplant of claim 1, further comprising a fire extinguisher system comprising at least one fire extinguishing medium source and at least a first outlet and a second outlet, wherein the first outlet is configured to provide extinguishing medium to the electric motor fire zone, wherein the second outlet is configured to provide extinguishing medium to the heat engine fire zone.

8. The powerplant of claim 7, wherein the electric motor fire zone is fluidly sealed from the heat motor fire zone such that extinguishing medium can be used in either fire zone independent of the other.

9. The powerplant of claim 1, wherein the firewall includes a metallic and/or composite baffle that surrounds the electric motor to form the electric motor fire zone.

10. The powerplant of claim 9, wherein the baffle is configured to be bolted to a nacelle.

11. The powerplant of claim 1, further comprising a ventilation pathway for each fire zone for providing outside air to each fire zone.

12. The powerplant of claim 11, wherein the ventilation pathway includes a dedicated nacelle scoop in fluid communication with each fire zone.

13. An aircraft, comprising:
    at least one hybrid electric aircraft powerplant, comprising:
       an electric motor configured to convert electrical energy into kinetic energy to turn a propulsor;
       a heat engine configured to convert a fuel into kinetic energy to turn the propulsor; and
       a firewall disposed around at least one of the electric motor or the heat engine to create an electric motor fire zone and a heat engine fire zone separate from the electric motor fire zone such that the electric motor is protected against a heat engine fire, and vice versa.

14. The aircraft of claim 13, wherein further comprising a nacelle.

15. The aircraft of claim 14, wherein the electric motor, the heat engine, and the firewall are disposed within the nacelle.

16. The aircraft of claim 14, wherein the nacelle forms at least a portion of the firewall.

17. The aircraft of claim 13, wherein the firewall is only an electric motor firewall that is around the electric motor, wherein there is no separate heat engine firewall surrounding the heat engine.

18. The aircraft of claim 17, wherein all electric motor components within a nacelle are contained within the firewall.

19. The aircraft of claim 13, further comprising a fire extinguisher system comprising at least one fire extinguishing medium source and at least a first outlet and a second outlet, wherein the first outlet is configured to provide extinguishing medium to the electric motor fire zone, wherein the second outlet is configured to provide extinguishing medium to the heat engine fire zone.

20. The aircraft of claim 19, wherein the electric motor fire zone is fluidly sealed from the heat motor fire zone such that extinguishing medium can be used in either fire zone independent of the other.

21. The aircraft of claim 13, wherein the firewall includes a metallic and/or composite baffle that surrounds the electric motor to form the electric motor fire zone.

\* \* \* \* \*